Sept. 18, 1945. W. J. MILLER 2,384,845
METHOD AND APPARATUS FOR JIGGERING POTTERYWARE
Filed Jan. 29, 1944 3 Sheets-Sheet 1

INVENTOR.
William J. Miller
BY
George J. Crominger
ATTORNEY.

Sept. 18, 1945. W. J. MILLER 2,384,845
METHOD AND APPARATUS FOR JIGGERING POTTERYWARE
Filed Jan. 29, 1944 3 Sheets-Sheet 2

INVENTOR.
WILLIAM J. MILLER
BY George J. Croninger
ATTORNEY

Sept. 18, 1945.   W. J. MILLER   2,384,845
METHOD AND APPARATUS FOR JIGGERING POTTERYWARE
Filed Jan. 29, 1944   3 Sheets-Sheet 3

INVENTOR.
William J. Miller
BY
George J. Cominger
ATTORNEY.

Patented Sept. 18, 1945

2,384,845

UNITED STATES PATENT OFFICE 2,384,845

METHOD AND APPARATUS FOR JIGGERING POTTERY WARE

William J. Miller, Swissvale, Pa., assignor to Miller Pottery Engineering Company, Swissvale, Pa., a corporation of Pennsylvania Application January 29, 1944, Serial No. 520,274

21 Claims. (Cl. 25—26)

This invention relates to improvements in methods and apparatus for jiggering potteryware. It has to do particularly with the matter of removing scrap clay produced during jiggering.

This application is a continuation in part of my co-pending application Serial No. 518,079, filed January 13, 1944.

In making potteryware such as dishes, cups and saucers and the like called "dinnerware" by automatic machine, the scrap clay resulting from the jiggering operation must be removed to avoid piling up around the jigger tool and associated mechanism and interfering with the operation thereof or falling back on the surface of the newly formed ware. It is customary to provide a spill pan having a hole therein through which the mold is admitted to the profile tool. The spill pan catches some of the scrap clay which must be removed therefrom either by hand, or by power driven scrapers or screws. Due to the clearance between the mold and the wall of the hole in the pan, stray bits of scrap clay spilling out of the pan or pushed over the edges by the scraper may fall into the ware so therefor the spill pan is no guarantee against scrap reaching the ware.

Where power driven scrapers, belts and screws are employed, there is a certain amount of supporting and operating structure adjacent the jigger and within range of the flying scrap. These parts, particularly these that are stationary, soon become crusted with clay which eventually hardens and either falls off as the clay becomes less adhesive or is vibrated loose. If the structure is in line with the spill pan hole, the scrap falls on the mold and spoils the ware or if it falls into the fresh scrap it tends to prevent the immediate pugging and reuse thereof because it is harder and beyond the stage where repugging is practical.

Plastic clay is highly adhesive. It will cling fast to any metal surface with which it comes in contact which means that pile ups and jams are frequent even where power driven scrapers, screws and belts are employed. To clear these "jams" and start the clay moving the operator must either stop the machinery, which is the safest course although production is interrupted, or else risk injury because of the close quarters and the moving machinery.

It is among the objects of this invention to provide for the more thorough and reliable removal of excess or scrap clay resulting from the jiggering operation. Another object is to reduce the equipment requirements and to eliminate all unnecessary structure and surfaces on which scrap clay may accumulate. Another object is to facilitate the movement of scrap clay from the jigger and thereby eliminate pile ups and jams.

According to the principles of this invention, the jiggering is done by a rotating profile inside a confined space having an outlet through which scrap clay is discharged and an inlet through which the mold is partly admitted to the jiggering chamber. The mold does not entirely enter the enclosure and the portions remaining outside the same are thus protected against contamination. The jigger tool operates as the blade or impeller of a centrifugal pump or fan and the clearance between the wall of the chamber and the tool is so slight that no appreciable amount of scrap can accumulate thereon. As a matter of fact, the walls may be continuously wiped to prevent any clay whatsoever from adhering thereto. Thus the interior of the chamber is maintained in a substantially clean condition at all times. The invention also comprehends a jigger unit including as an essential part thereof a demountable and replaceable attachment for cooperating with the jigger tool in the removal of scrap during the jiggering operation.

Figure 3:
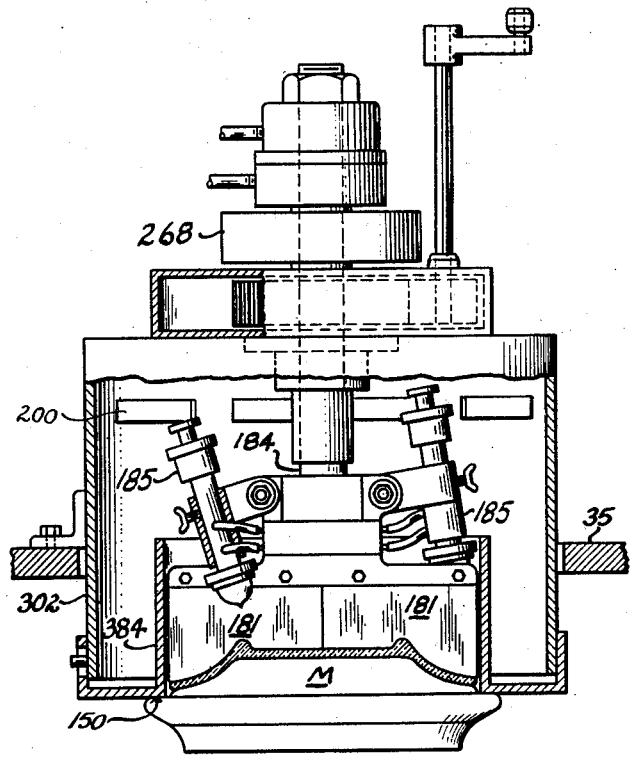
Figure 3 is a detail of the profiling unit including the novel invention hereof.
Figure 1:
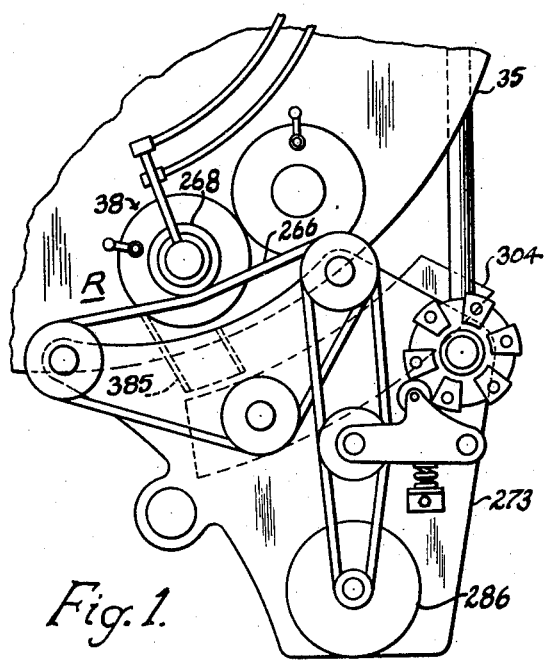
Figure 1 is a plan view of a fragment of an automatic potteryware jiggering machine showing the jiggering station.

With reference to Figure 1, 38 is a jigger several of which are mounted in angularly spaced apart relation near the perimeter of an intermittently rotated table 35 which brings each unit in successive order to a jiggering position R where driving belt 266, driven by motor 286, engages roller 268 fixed on rotatable jigger tool shaft 184, Figure 3, thereby causing jigger tools 181 inside vented housing 302 to be rotated. A mold M, bearing a charge of clay to be jiggered is raised into co-operation with the jigger tool or profile which forms the back of the ware in the case of flatware or the interior of the piece in the case of hollow ware.

The entire jigger structure which revolves including the spindle, spray guns, profiles, profile holders, drive pulley etc. is dynamically and statically balanced so as to dampen torsional vibration and insure true running of the tools. Said tools 181 may have different jiggering characteristics, for instance one blade may be for rough cutting and the other for finishing or polishing or both may have the same jiggering characteristics.

Water for lubricating the ware during jiggering is continuously supplied to the spray guns 185 which are of conventional design having an automatic valve in the water line to be opened when compressed air is turned on to atomize the water.

The open bottom housing 302 which encloses the jigger unit, Figures 1-5, projects through an oversize hole slightly in rear of the perimeter of table 35 and is supported thereon by brackets 309 with oversize holes therein for receiving bolts 310 screwed into the table. The jigger unit is capable of a limited amount of adjustment in centering the jigger tool on the vertical axis of the chuck therebelow.

Attached to the lower end of the housing is a replaceable casing 380 which co-operates with the jigger tool in directing the scrap clay produced during jiggering into a stationary chute. Said casing, Figures 4, 5 and 6 comprises a sleeve portion 381 which fits over the outside of housing 302 and is attached thereto by several bayonet slot 382 and pin 383 connections. The slot is purposely made larger in order to allow the casing to be raised up by engagement of the perimeter of the mold therewith in that circular flange portion 156 Figure 3 of the bottom of the casing adjacent the circular sleeve 384 which projects upwardly inside housing 302 and surrounds tool 181, there being a minimum of clearance between the tool and the inside wall of sleeve 384. 385, Figures 1, 4, 5 and 6, is a side outlet nozzle from sleeve 384, which projects tangentially from the casing through the interrupted portion of sleeve 381 and an aperture 386 in the bottom housing 302 facing chute 304, Figure 2.

The nozzle is preferably short and preferably extends only a short distance beyond the perimeter of table 35. The radius of the nozzle tip co-incides with that of the perimeter of the table (see radius R1, Figure 5) and the curved inlet 303 (see radius R2) of the chute 304. While the major portion of the scrap clay is discharged at the jiggering position, the tool may rotate until pulley 268 disengages belt 266, see Figure 1, and thus the purpose of extending the chute beyond the point where the driving association is interrupted is to catch any stray bits of clay which may cling to the tool and not release until the tool starts to move away from the jiggering position. The speed of rotation of the tool may be increased near the end of the jiggering operation to make certain that all scrap clay clinging to the tool will be thrown off before it reaches the end of the chute. Otherwise the clay dries out on the tool and forms a scale which detrimentally affects the surface of the ware should it fall thereonto.

Figure 2:
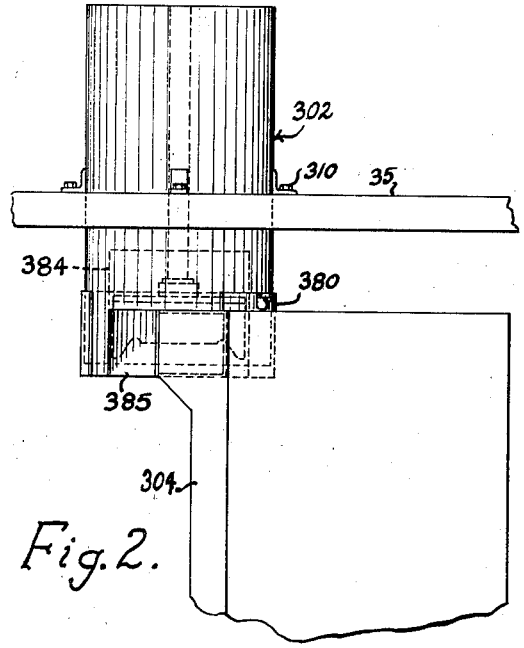
Figure 2 is an elevation of the jigger station shown in Figure 1.
Figure 6:
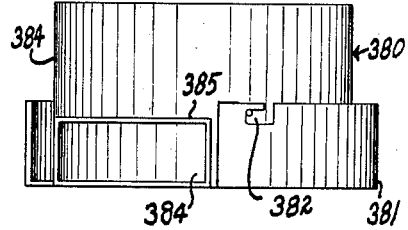
Figure 6 is an elevation of the scrapper housing removed from the jigger unit.
Figures 4, 5:
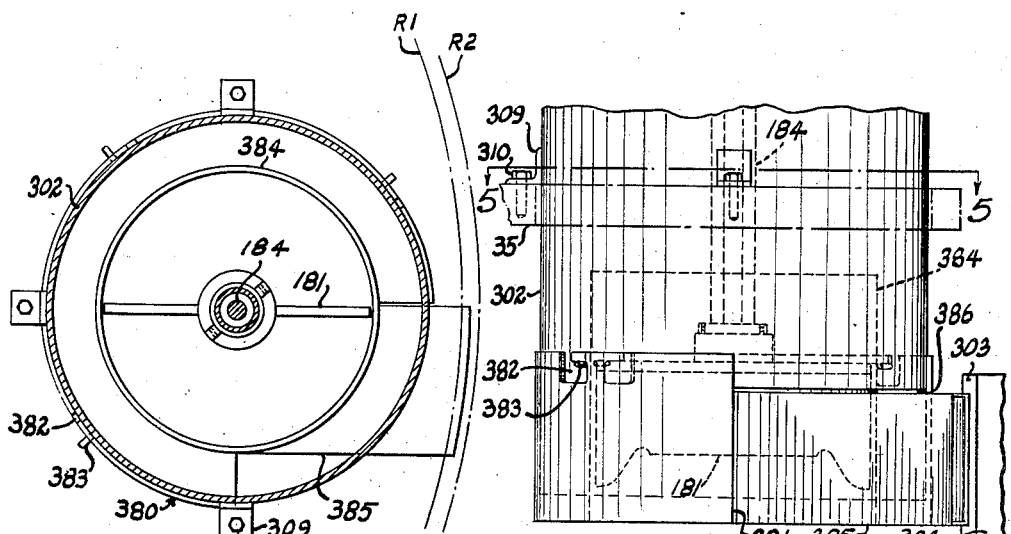
Figure 4 is a fragmentary detail of the lower end of the profiling unit of Figure 3.
Figure 5 is a horizontal section taken on line 5—5 of Figure 4.

The floor of the nozzle 385 and the inlet 303 may slope, the angle of inclination co-inciding so as to readily gravitate scrap into the vertical portion of the chute which falls through an outlet, Figure 2, into the surface of an endless off-bearing belt. The belt may discharge directly into a blunger (not shown) where the clay is mixed with water preparatory to reprocessing or it may discharge into a receptacle for conveying clay to the blunger or into the hopper of the pug mill for supplying the machine with clay. The chute is secured at the upper end to the underside of platform 278 and is also supported from below.

In the foregoing construction, the jigger tool 181 functions as the impeller of a centrifugal fan or pump to cause the discharge of scrap clay through the tangentially disposed nozzle. The mold substantially seals the bottom hole of sleeve 384 when it comes up against the housing and lifts it up off pins 383. This prevents scrap clay from falling down through the normally open end of the sleeve and due to the absence of any appreciable clearance between the inside wall of the sleeve and the tool, the scrap clay cannot accumulate on these surfaces and is compelled to leave the housing through the nozzle. This construction eliminates such appurtenances as spill pans, power driven scrapers, which operate in troughs surrounding the tool and push the clay over a hole in the floor of the trough, screw conveyors and other conventional equipment used to remove the scrap from the immediate vicinity of the tool.

When changing the jigger tool set up from larger to smaller diameter ware or vice versa, casing 380 may be removed and replaced by one having a sleeve 384 of proper diameter to operate as described with the replacement profile. The provision of a bayonet slot connection with the housing 302 facilitates replacement.

Figure 7:
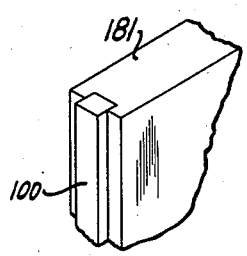
Figure 7 is a fragment of one of the jigger tools.

If desired, the outer marginal edges of the jigger tools may be provided with scrapers 190, see Figure 7, replaceably set in vertical grooves. These scrapers may be made of leather, hard rubber or other suitable material and engage the wall of the inner sleeve, wiping it clean of clay as they revolve with the tool.

Openings through which air may be admitted to housing 302 are shown at 200, Figure 3. The mold, when in engagement with the casing 381 substantially seals the inlet to the sleeve 384 which however is open at the top to admit air to the jiggering chamber formed by the sleeve.

Figure 8:
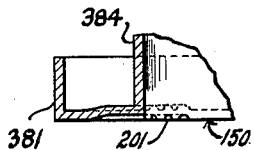
Figure 8 is a fragmentary detail showing how the air intake is formed.

If desired, an air intake may be formed by crimping the casing in the circumferential zone 150 as at 201, Figure 8, the crimps being sufficiently long to clear the margin of the mold brim and thus provide for inlets beyond the periphery of the mold. Thus the air intake would be concentric with an below the axis of rotation of the tool 181.

Figure 9:
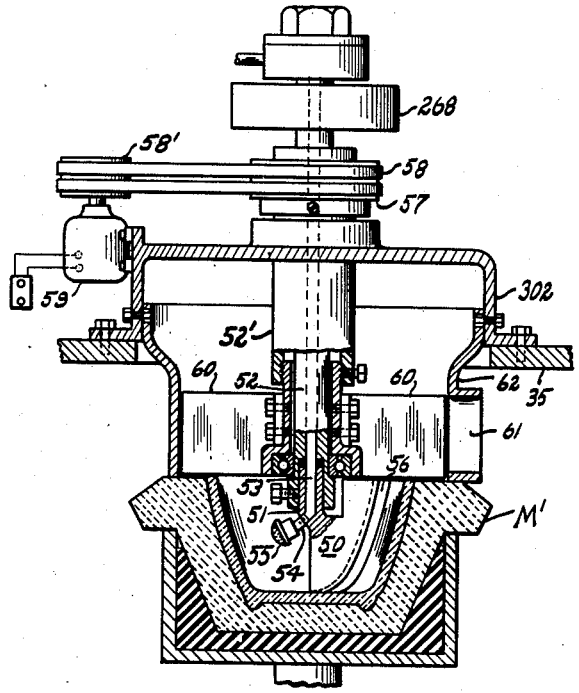
Figure 9 is a sectional elevation illustrating how the principles of this invention would be applied to hollow ware jiggering apparatus.

In making hollow ware, the molds M, Figure 9, are cavitous and the ware is formed by inserting a tool 50 therein and relatively rotating the mold and tool. Tool 50 is detachably held by a stem 51 in a socket formed in the lower end of the jigger spindle 52 which is rotated in the manner previously described. The spindle is hollow and conducts jiggering lubricant to the passage 53 in the tool stem. A pipe fitting 54 is screwed into the outlet end of passage 53 and a spray head 55 attached thereto for directing the fluid against the ware surface. The tool may be of conventional design or may have an extruding groove 56 leading from the inner edge upwardly along the clay contacting surface to the top for conducting scrap clay to the level of the top of the mold.

Sleeved on the jigger spindle 52 is a hollow shaft 52′ rotated by gears 57 and 58 and motor 59. Demountably attached to the lower end of the shaft are a plurality of radially disposed blades 60 whose lower edges are above but in close proximity to the upper surface of the profile tool and the outlet of the extruding groove. This rotatable impeller is driven at a higher speed of rotation than the jigger tool if both are rotated in the same direction and its purpose is to discharge the excess clay through the discharge outlet 61 in blower casing 62. The impeller may be rotated in a direction counter to that of the jigger and at sufficient speed to perform the desired function. Blower casing 62 is demountably attached to housing 302 by a bayonet slot connection with the inside of the housing which is shorter than that of Figure 3. The diameter of the lower end of the housing is such that the mold M′ closes the outlet end of the casing when in jiggering position and, as previously described, is arranged to be lifted by the mold.

Figure 10:
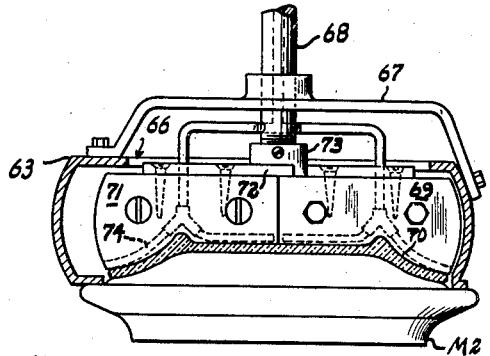
Figure 10 is a sectional elevation of modified form of jigger including the improvements hereof.
Figure 11:
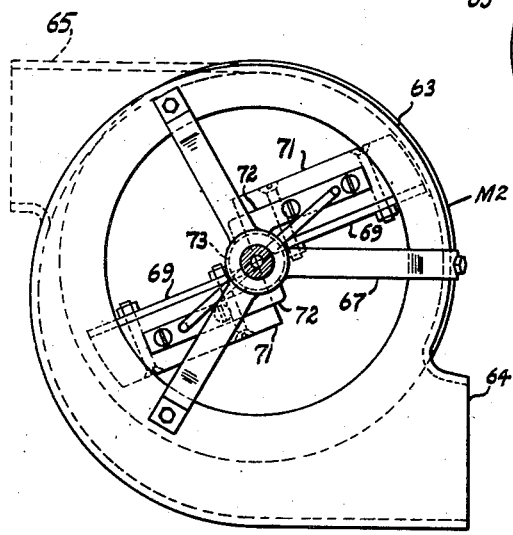
Figure 11 is a plan view of the modified form of jigger of Figure 10.

In the structure of Figures 10 and 11, the curve of the outer or scroll sheet of the horizontally disposed casing 63 is that of a spiral such as that found in centrifugal pumps. The casing may have a single discharge outlet 64 or it may have a double discharge 180° apart the other outlet being shown by dotted lines at 65. An axial air inlet 66 is provided, the opposite side of the casing being closed by the mold M2 when in jiggering position. A bearing cage 67 is secured to the casing over the inlet to support the vertical jigger spindle 68 on which are mounted a plurality of radial profile tools 69 inside the casing each having an edged profiling surface 70. These blades are attached by screws to wooden backing blocks 71. The backing blocks are secured to the offset arms 72 of a holder having a threaded collar 73 for attachment to the jigger spindle which is driven by pulley and belt described in connection with the structure of Figure 3. The profile blades and backing blocks act as the impeller of a centrifugal fan or pump and blow the scrap clay produced during jiggering through the outlet or outlets. To lubricate the ware, water is piped from the hollow jigger spindle to a perforated tube 74 lying in an open groove in the underside of each backing block.

It will be understood that the generatrices of the impeller blades of the various structures shown herein may be parallel to the axis, curved backward, radial and curved forward respectively.

I claim:

1. The method which comprises, jiggering plastic material in proximity to a high velocity, spirally moving stream of fluid carrying away the scrap clay and applying lubricant to the ware from a position below the level of the stream of fluid.

2. The method which comprises, jiggering plastic material in a chamber closed except for an air intake and a normally open horizontal discharge outlet, and discharging substantially all of the scrap produced during jiggering through said outlet by centrifugal force.

3. The method which comprises, jiggering plastic material in proximity to a high velocity, stream of air created by a centrifugal pump, and discharging substantially all of the scrap produced during jiggering through the discharge outlet of the pump by centrifugal force.

4. The method which comprises, jiggering plastic material below a high velocity centrifugal pump, elevating the scrap to the level of the pump blades and discharging the scrap through the discharge outlet of the pump by the action of the blades.

5. In apparatus for jiggering potteryware, the combination of a profiling means for forming the ware and a centrifugal pump operable to discharge substantially all of the scrap clay produced by the action of the profiling means through the discharge outlet of the pump.

6. In apparatus for jiggering potteryware on molds, a blower having a casing with a normally open discharge outlet and an air intake, a rotatable spindle, profiling means attached to said spindle, said blower having an opening and a surface surrounding said opening for engagement with said molds, and means for rotating said spindle to thereby jigger clay on the molds and discharge scrap clay through the outlet.

7. In apparatus for jiggering potteryware on molds, a blower having a casing with a normally open discharge outlet, an air intake and an opening to be closed by the mold when in jiggering position, a rotatable jigger spindle, a profile tool attached thereto, a hollow shaft sleeved on said spindle, a multiple blade impeller attached thereto within said casing and means for rotating said jigger spindle and shaft to jigger the ware and discharge the scrap through the outlet.

8. In apparatus for jiggering potteryware on molds, the combination of a blower having a spiral casing provided with an outlet, an air intake and an opening to be closed by the mold, and an impeller comprising a rotatable spindle having edged profiling means attached thereto, the edged surface being for jiggering the ware and the back of the profiling means acting as the vanes of a blower to effect the discharge of scrap clay through the outlet and means for rotating said spindle.

9. An apparatus for jiggering potteryware, a centrifugal fan, the blades of which are formed by profiling tools to serve both as ware fabricating implements and the vanes of the impeller which act to discharge clay through the discharge outlet of the fan casing.

10. An attachment to be mounted on a potteryware jiggering mechanism having a rotatable profile which comprises a casing to be placed around the profile tool, the wall of said casing being in such proximity to the tool as to enable the tool to act as the impeller of a centrifugal pump for the discharge of scrap clay, said casing having a discharge outlet through which the clay is discharged by the action of the tool.

11. The combination with a potteryware jiggering apparatus having a rotatable profile of a blower housing concentric with said profile having a discharge outlet, said housing being formed to cause the discharge of scrap clay through the outlet by the rotative action of the profile and means for rotating said profile.

12. The combination with a potteryware jiggering apparatus having a rotatable profile of a blower housing concentric with the axis of rotation of the profile having a discharge outlet, said housing being formed to provide a jiggering chamber in which the profile acts as an impeller to cause the discharge of scrap clay through the outlet by centrifugal force induced by the rotative action of the profile and means for rotating said profile tool.

13. The combination with a potteryware jiggering apparatus having a rotatable profile of a blower housing surrounding the profile tool having a discharge outlet at the level of the profile, said housing being formed to provide a jiggering chamber of almost the same diameter as the circle of rotation of the profile tool with some slight clearance therebetween in which the profile acts as an impeller to cause the direct discharge of scrap clay through the outlet and means for rotating said profile tool.

14. The combination with a pottery jiggering apparatus having a rotatable profile of a blower housing surrounding the profile tool having a discharge outlet, said housing being formed to provide a jiggering chamber of almost the same diameter as the circle of rotation of the profile tool with some slight clearance therebetween and having an opening thereinto of smaller diameter than the diameter of a mold therebelow but large enough to admit the molding surface to the jiggering chamber and means for rotating said profile to cause the same to perform a profiling operation and to discharge clay through said outlet by centrifugal action.

15. Apparatus for jiggering potteryware on the molding surface of absorbent molds comprising a rotatable profile tool, a casing surrounding said tool to be supported by the mold during the jiggering operation, said casing having an opening therein to permit co-action between the tool and mold and an outlet through which scrap clay removed from said clay is discharged by said tool.

16. Apparatus for jiggering potteryware on the molding surface of absorbent molds comprising a rotatable profile tool, a casing surrounding said tool forming a jiggering chamber having an open bottom to admit the molding surface of the mold, said casing having a flange outside the jiggering chamber to be engaged by the mold and substantially close the bottom of the jiggering chamber, the wall of the jiggering chamber having an opening therein through which scrap clay is discharged and means for rotating said profile tool to cause the same to fabricate ware from said clay and to discharge scrap clay through said outlet.

17. Apparatus for jiggering potteryware on the molding surface of absorbent molds comprising a rotatable profile tool, a casing surrounding said tool, a support for said casing on which said casing is vertically movable, said casing being formed with a sleeve in which the jigger tool operates having an outlet and a bottom inlet to admit the molding surface of the mold, said casing to be supported by said mold when in jiggering position, and means for rotating said profile tool to jigger the ware, the scrap clay produced being discharged by the tool through the outlet.

18. In apparatus for jiggering potteryware on the molding surface of dinnerware jigger molds, a rotatable profile tool and a casing having a side outlet surrounding said tool formed to provide a chamber the wall of which is in such close proximity to the vertical edge of the profile tool as to coact therewith in causing the centrifugal discharge of substantially all of the scrap clay produced by the tool through the outlet and means for rotating said tool.

19. In apparatus for jiggering potteryware on the molding surface of dinnerware jigger molds, a rotatable profile tool, a support, a casing having a side outlet detachably mounted on said support, said casing being formed to provide a jiggering chamber surrounding said tool the wall of which is in such close proximity to the vertical edge of the profile as to compel the centrifugal discharge of substantially all of the scrap clay produced by the tool through the outlet and means for rotating said tool.

20. In apparatus for jiggering potteryware on the molding surface of dinnerware molds, a rotatable profile tool, a casing having a side outlet surrounding said tool formed to provide a chamber the wall of which is in such close proximity to the vertical edge of the profile tool as to compel the centrifugal discharge of substantially all of the scrap clay produced by the tool through the outlet.

21. In combination, means for jiggering potteryware, a centrifugal pump thereabove having an impeller provided with blades, and means for elevating the scrap to the level of the pump blades to be discharged through the pump outlet by the action of the blades.

WILLIAM J. MILLER.